United States Patent
Ball et al.

(10) Patent No.: US 9,195,677 B2
(45) Date of Patent: Nov. 24, 2015

(54) SYSTEM AND METHOD FOR DECORATING A HOTEL ROOM

(76) Inventors: Stephen Ball, Stamford, CT (US); Courtney Ball, Stamford, CT (US)

( * ) Notice: Subject to any disclaimer, the term of this patent is extended or adjusted under 35 U.S.C. 154(b) by 236 days.

(21) Appl. No.: 13/476,831

(22) Filed: May 21, 2012

(65) Prior Publication Data

US 2012/0297325 A1     Nov. 22, 2012

Related U.S. Application Data

(60) Provisional application No. 61/488,168, filed on May 20, 2011.

(51) Int. Cl.

| | |
|---|---|
| *G06F 17/30* | (2006.01) |
| *G06Q 10/02* | (2012.01) |
| *H04N 21/41* | (2011.01) |
| *H04N 21/414* | (2011.01) |
| *H04N 21/422* | (2011.01) |
| *H04N 21/472* | (2011.01) |
| *H04N 21/4722* | (2011.01) |
| *H04N 21/475* | (2011.01) |
| *H04N 21/45* | (2011.01) |
| *H04N 21/4788* | (2011.01) |

(52) U.S. Cl.
CPC .... *G06F 17/30244* (2013.01); *G06F 17/30265* (2013.01); *G06Q 10/02* (2013.01); *H04N 21/4122* (2013.01); *H04N 21/41415* (2013.01); *H04N 21/42202* (2013.01); *H04N 21/42219* (2013.01); *H04N 21/47205* (2013.01); *H04N 21/4532* (2013.01); *H04N 21/4722* (2013.01); *H04N 21/4756* (2013.01); *H04N 21/4788* (2013.01)

(58) Field of Classification Search
CPC .......... G06F 3/04847; G06F 17/30244; G06F 17/30265; H04N 21/4122; H04N 21/41415; H04N 21/42202; H04N 21/42219; H04N 21/47205; H04N 21/4532; H04N 21/4722; H04N 21/4756; H04N 21/4788
USPC .................. 715/764, 782, 848–852; 703/3, 6; 345/419–427
See application file for complete search history.

(56) References Cited

U.S. PATENT DOCUMENTS

| | | | | |
|---|---|---|---|---|
| 3,796,829 | A * | 3/1974 | Gray | 725/82 |
| 6,833,879 | B1 * | 12/2004 | Angel et al. | 348/744 |
| 2003/0088832 | A1 * | 5/2003 | Agostinelli et al. | 715/526 |
| 2006/0230334 | A1 * | 10/2006 | Slawson et al. | 715/500.1 |
| 2006/0288370 | A1 * | 12/2006 | Rothschild | 725/51 |
| 2007/0169115 | A1 * | 7/2007 | Ko et al. | 717/174 |
| 2007/0189737 | A1 * | 8/2007 | Chaudhri et al. | 386/125 |

(Continued)

OTHER PUBLICATIONS

Back to the Future Part II. Dir. Robert L. Zemeckis. Prod. Neil Canton and Bob Gale. Perf. Michael J. Fox, Christopher Lloyd, Lea Thompson, and Thomas F. Wilson. Universal Pictures, Nov. 22, 1989.*

(Continued)

*Primary Examiner* — Sherrod Keaton
*Assistant Examiner* — Justin R Blaufeld
(74) *Attorney, Agent, or Firm* — Whitmyer IP Group LLC (57) ABSTRACT

System and method for displaying and managing content includes a database of content that a user may access, select and pay for. The content is distributed to a projection device and the user is able to control the projection with the use of a pointing device.

13 Claims, 6 Drawing Sheets

(56) References Cited

U.S. PATENT DOCUMENTS

| | | | |
|---|---|---|---|
| 2007/0236671 A1* | 10/2007 | Bitetto | 353/122 |
| 2008/0016533 A1* | 1/2008 | Rothschild | 725/60 |
| 2009/0019055 A1* | 1/2009 | White | 707/10 |
| 2009/0091532 A1* | 4/2009 | Hockett | 345/158 |
| 2009/0115971 A1 | 5/2009 | Shan et al. | |
| 2009/0160856 A1* | 6/2009 | Hoguet | 345/420 |
| 2009/0164952 A1 | 6/2009 | Wilson | |
| 2009/0237363 A1 | 9/2009 | Levy et al. | |
| 2009/0260044 A1* | 10/2009 | Wang et al. | 725/87 |
| 2009/0284539 A1* | 11/2009 | Huang et al. | 345/564 |
| 2009/0309834 A1* | 12/2009 | Adams | 345/166 |
| 2009/0322676 A1* | 12/2009 | Kerr et al. | 345/158 |
| 2010/0005062 A1* | 1/2010 | Van Den Dungen | 707/3 |
| 2010/0013767 A1 | 1/2010 | Gu et al. | |
| 2010/0017440 A1* | 1/2010 | Guo | 707/104.1 |
| 2010/0060803 A1* | 3/2010 | Slack et al. | 348/744 |
| 2010/0081375 A1* | 4/2010 | Rosenblatt et al. | 455/41.1 |
| 2010/0281394 A1* | 11/2010 | Gopi et al. | 715/748 |
| 2011/0055709 A1* | 3/2011 | Wang et al. | 715/736 |
| 2012/0240060 A1* | 9/2012 | Pennington et al. | 715/753 |

OTHER PUBLICATIONS

Amazon.com, Inc. Introducing Amazon Cloud Drive, Amazon Cloud Player for Web, and Amazon Cloud Player for Android. N. p., Mar. 29, 2011. Web. Feb. 28, 2014. <http://phx.corporate-ir.net/phoenix.zhtml?c=176060&p=irol-newsArticle&ID=1543596>.*

High-Tech Service for Hotel Guests, World Future Society, (published in Mar./Apr. 2008) (obtained from http://www.wfs.org/node/368 on Jul. 1, 2015).*

* cited by examiner

SYSTEM AND METHOD FOR DECORATING A HOTEL ROOM

CROSS-REFERENCE TO RELATED APPLICATIONS

This patent application claims the benefit, under 35 U.S.C. §119(e), of U.S. Provisional Patent Application Ser. No. 61/488,168, filed on May 20, 2011, the content of which is incorporated herein by reference in its entirety.

BACKGROUND

In recent years, the growth of the Internet has led to "thinner" computer clients, with much of the computer processing now being performed in the "cloud." What this means is that client computers connect through a network such as the Internet to a server computer that "serves" up content to the client. However, even thin client computers such as notebook computers and tablets are bulky and difficult to maneuver.

In homes and other lodgings, wall decorations are desirable to complete a decorative theme. Artwork is typically selected and hung, and remains in place until a redecorating event occurs, even if the chosen decorations are no longer of interest to the occupants or fail to track changing furniture styles and tastes of the occupants. Further, artwork selection is typically limited by price and availability. Artwork is also usually selected by a small subset of the people who will actually view the artwork Content creators are varied and numerous. Typically, they create a digital work and provide it to consumers at a purchase price. However, many content creators lack the technical abilities to reach a greater number of potential consumers as well as the ability rent or lease their content.

Therefore, what are needed are superior systems and methods for displaying and controlling centralized content.

SUMMARY

The needs set forth herein as well as further and other needs and advantages are addressed by the present embodiments, which illustrate solutions and advantages described below.

The present embodiment can include, but is not limited to including, a projector that can project on any display medium such as, for example, but not limited to, an open wall or a ceiling, where the projector can also include a light detector. The present embodiment can further include a pointer configured with an activation device, for example, a laser pointer that includes a selector (e.g., a "clicker" like a mouse). When the pointer is pointed at the projected image, the light detector may determine where the pointer is pointed and send that information, for example, wirelessly, to a properly configured computer. The projector may be configured with a projection system that can provide outline signifiers, for example, patterns or colors, on the displayed projection image. The projection system can be configured such that the displayed image may be dragged around the display medium when the pointer and selector are cooperatively operated. The projection system can determine the outline of the projected image from the outline signifiers and correct the display to its proper proportions as it is dragged, moved, etc. The projection system can also include an inventory of objects and their locations in the image, and can thus determine where the pointer is relative to the objects. This enables selection of particular objects in the image, similar to selection of objects (e.g., buttons, icons, menus, etc.) on a computer screen using a traditional mouse.

The present embodiment can also include a server executing content selection subsystems, the server collectively managing the content (e.g., image(s), decoration themes, etc.) that is displayed through the system (e.g., projection, etc.). For example, in one embodiment the content selection subsystems access information from the Internet and download home themes to decorate the walls, ceiling, etc. according to a theme. The information is, for example, but not limited to, subscription-based and rotates through pieces of art for enjoyment or education. Information about the art can accompany the art as it is displayed in order to educate the viewer. For example, a user can subscribe to a theme of "American modern art." In this case, the projection system receives American modern art images, cycles through and displays the images, and provides information about each image. Further, the user can be directed to associated websites or other content and can use the pointer to access those sites to learn more about the images, comment, or purchase related products or services, although not limited thereto. In addition, decoration decisions can be augmented by feedback from a network of friends and associates.

In one embodiment, the projection device is a frame with a special screen material and a small projector that extends out from the frame and projects onto the screen, similar in appearance to museum artwork lighting. Lodging accommodators can decorate rooms according to guests' particular preferences, or a guest could provide personal images such as, for example, family photos, to be displayed. The device can be employed for a number of different uses desiring flexible decorating, including parties, dorm rooms, public spaces (e.g., advertising, etc.) In yet another embodiment, a central controller can control multiple projection systems that display selected images around the rooms of a building.

A method according to the present teachings can include, but is not limited to including, the steps of communicating with a server managing revenue streams associated with electronic information, configuring at least one media player operatively connected to the server (e.g., may be wirelessly connected, etc.) to receive the electronic information in exchange for revenue, receiving decoration preferences, accessing the electronic information based on the preferences, providing the electronic information to the wireless media player, receiving the revenue, and accessorizing a room with the electronic information output from the wireless media player. The method may further comprise the step of receiving recommendations about said step of accessorizing from a social network.

Other embodiments of the system and method are described in detail below and are also part of the present teachings.

For a better understanding of the present embodiments, together with other and further aspects thereof, reference is made to the accompanying drawings and detailed description.

DETAILED DESCRIPTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In one embodiment, although not limited thereto, a projection system such as one described herein can utilize previous unused space (e.g., project on a ceiling, wall, etc.). The projection system can include an projection correction processor correcting for the angle of projection in order to present a rectangular view to the user like a traditional computer screen. The shape of the projected image is not limited to a rectangle and it is to be appreciated that in particular circumstances it may be preferable to project other shapes including, but not limited to, circles, ovals, triangles, or other shapes.

The projection system can be used to "surf" the Internet while the user lounges on the couch. The comfort of the user is not hampered by traditional technology requiring bulky hardware manipulated by the user's hands. Instead, the projector (which can be mounted on a high stand, etc.) can project on any open wall or the ceiling, although not limited thereto. A pointer, such as, for example, but not limited to, a laser pointer, can control the projection. This configuration can provide very light hardware control by the user and ease of maneuverability with the use of cordless devices (e.g., keyboard, pointer, mouse, etc.), although not limited thereto.

The projector can include, but is not limited to including, sensors, for example, but not limited to, light sensors, that can sense the pointer device in the projected image. By pressing the button on the laser pointer, a signal, for example, but not limited to, a radio wave, can be sent to the projection system, which can register as a "click" of a mouse, for example, although not limited thereto. In this way, the user can position the laser pointer in the top portion of the projected screen, then drag the screen anywhere in the room. For example, the user may click and drag the projected screen from the ceiling to the wall, although not limited thereto.

A portion in the screen can register that the screen is to be "dragged," for example, but not limited to, a small area in the corner of the projection. When the projection system detects the pointer in this area of the screen and a "click" is registered, the projector can move the location of the screen to wherever the user moves the pointer. Another area in the screen can be used to rotate the screen. If the screen is to be controlled while projected onto a ceiling, the screen can be oriented depending upon the orientation of the user. In another embodiment, the screen can automatically correct to the horizon of gravity when moved to a vertical projection, such as one a wall. For example, the system can utilize an accelerometer or similar technology, although not limited thereto. The "pointer" can also include a device such as, for example, but not limited to, an accelerometer that can recognize movements by a user in order to control content.

In one embodiment, the projector can compensate for the angle of the projection, so as to assure that a rectangular image (versus trapezoid) is shown, regardless of the angle between the projector and the projection surface. The angle compensation can automatically correct the projection angle according to well-known algorithms and assure a proper projection.

The projector can include sensors to sense particular light patterns at in the projected screen, for example, but not limited to, in the corners, to determine the outline of the projection. Sensors can be used by the projector to calculate distances (e.g., laser measure, etc.) between the projector and each of the light patterns. Using these measurements, which can include the measurement(s) of the projector to the ceiling/walls(s), the projector can determine if the projection is a uniform rectangle (or other desirable shape) and can compensate accordingly, if desired.

The projector can also include a light detector to determine a controller spot in relation to the projection. For example, a laser pointer can be aimed at the projection, a button press or other type of selection can be made, and the laser pointer can send a signal to the projection device emulating, for example, a mouse click. In one embodiment, the user can "surf" the Internet by simply following links in this way, without the need for a keyboard or other input device. The projection system can optionally store a user profile that can provide links or other content, which the user can manage. In another embodiment, the projection system can provide alternative data input data capability, for example, but not limited to, with the pointer. For example, the projection system could display a legend for selecting common words or letters, or could recognize pointer movements (e.g., character recognition, etc.).

Marked areas of the projection, for example, but not limited to, the corners, may allow the projection device to determine where the pointer is relative to any objects in the projection. Therefore, for example, the projection device can determine if a user is clicking a particular place (e.g., button, etc.) in the projection content when the click signal is detected. For example, the user may surf Internet web pages in this fashion. The projection device can determine where laser points are located and how far they are from the device. In this way, the projection device can correct the projection and determine where a user clicks or wants to drag or otherwise manipulate the projection (e.g., rotate, resize, etc.).

The full functionality of devices such as these described may be provided to utilize previously unused ceiling space (or wall space, etc.), although not limited thereto. For example, at one time a user may utilize a pointer while lying on his/her back on the sofa as the screen is projected onto the ceiling. At another time, the user may drag the screen to other walls and utilize a wireless keyboard to enter information just like any other computer, although not limited thereto. Because the projector is able to compensate for the angle of projection, it can be projected anywhere, in any size (e.g. user may enlarge, make smaller, etc.), and in any orientation.

The projection system of the present embodiment can provide a content delivery system. For example, the user may enjoy the benefits of a decoration system for home, business, etc. The projection system can include, but is not limited to including, a central controller and multiple projection pods (on stands, mounted on ceiling, etc.) that can control projections onto one or more surfaces, for example, walls, ceilings, furniture, cabinets, etc. The projection system can display home decorations that can be downloaded and/or purchased by subscription to instantaneously decorate a house/apartment/hotel room/etc. In another embodiment, the content can include advertising, and advertisers can use the system of the present embodiment to bid on advertising time, upload their advertisements, and have them displayed through the projection system, which may be located in a public space.

The projection system can connect to a website or some other centralized computer where it can download decorating themes and automatically decorate the walls and ceiling of a structure according to a theme. In one embodiment, using the measuring capabilities of the projection system, the system can automatically scan a room and recommend decorations based upon the room's size and layout. The projection system of the present embodiment can provide a service for displaying artwork in the home, hotels, etc. For example, paintings, photographs, digital art could all be utilized and paid for, such that part of the charged fee is shared with the copyright owner/content creator. The content can be subscription-based and rotate through famous pieces of art, for example, although not limited thereto. Hotels can use the projection system of the present embodiment to "decorate" rooms to each guests' particular preferences based upon a known profile of the guest user. In another embodiment, a guest could upload preferred content (e.g., family photos, etc.) which may automatically be displayed in the hotel room upon arrival. The projection system can access a user profile that can include preferences. The projection system can enable content selection and download.

In another embodiment, the projection system can enable an educational mode in which the projection system locates content according to a theme and displays the content along with information about the content. The projection system can enable further interactive research about the content interactive, for example, but not limited to, web surfing through the projection system to learn more about the content.

In one embodiment, the projection device can be shaped like a frame with a special screen material and a small projector that extends out from the frame and projects onto the screen. In this way, the projector may look just like lights do on traditional frames that are used in museums today. In another embodiment, the projection device can include a flat panel monitor or similar device, although not limited thereto. For example, content can be provided to television screens or computer screens in applications or as screensavers or backgrounds, although not limited thereto. Instead of projecting, a network connectable controller including the technology of the present embodiment can be associated with one or more display devices (e.g., televisions, monitors, etc.) and can deliver content to the devices wirelessly (e.g., radio transmission, BLUETOOTH®, wifi, etc.) or through a wired connection.

Figure 1:
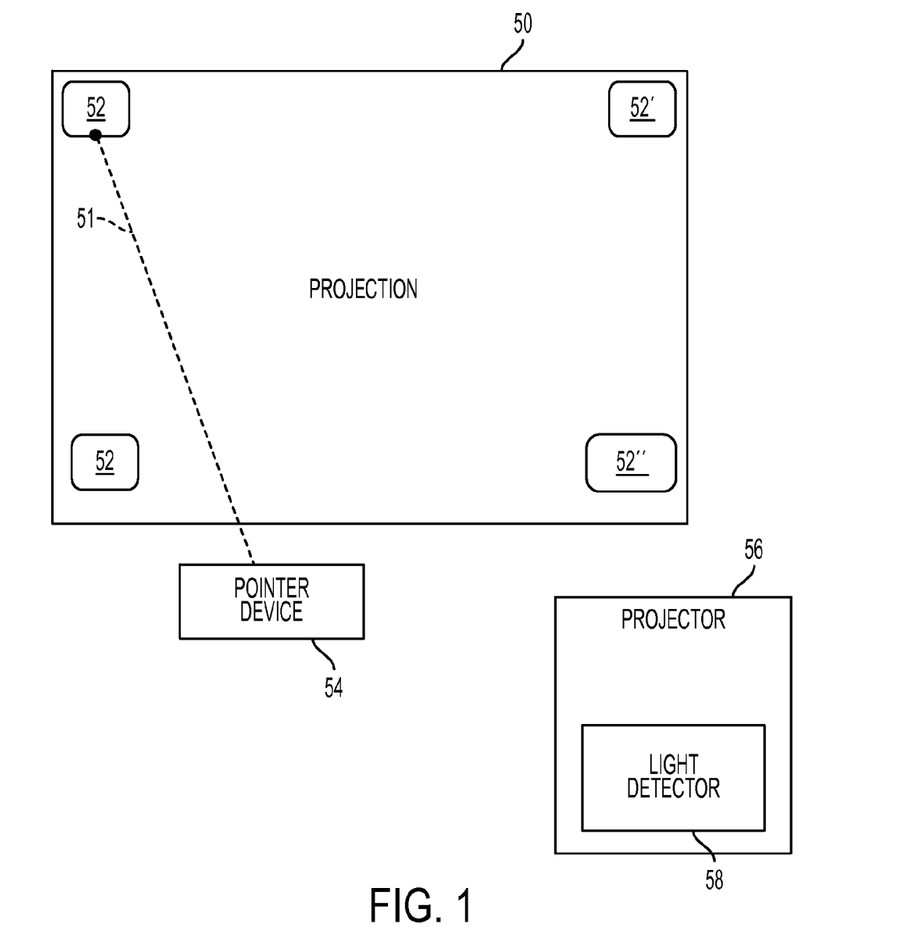
FIG. 1 is a schematic diagram depicting one embodiment of the projection system according to the present teachings.

Referring now to FIG. 1, shown is a schematic diagram depicting one embodiment of the projection system according to the present teachings. In the present embodiment, projector 56 projects content onto a projection surface, thus creating a projection 50. A pointer device 54 can interact with the projection 50 as, for example, but not limited to, a mouse. The projector 56 can include a light detector 58 that can detect the location of the light emitted 51 from the pointer device 54 and track pointer position and activity. For example, a user may point the pointer device 54 at the projection 50 and click a button on the pointer device in order to register a "mouse click" on the projection 50, although not limited thereto. In this way, a user may control the projection 50 like a computer screen. The projection 50 can include, but is not limited to including a number of reserved areas 52, 52', 52", that can be used to control the projection 50, although not limited thereto. For example, area 52 can be used to drag the projection 50 such that when the pointer device 54 is pointed at area 52 and a button is clicked, the projection 50 can be dragged to another location, although not limited thereto. In a similar way, areas 52' and 52" can provide the ability to rotate, resize or control some other functionality of the projection 50.

Figure 2:
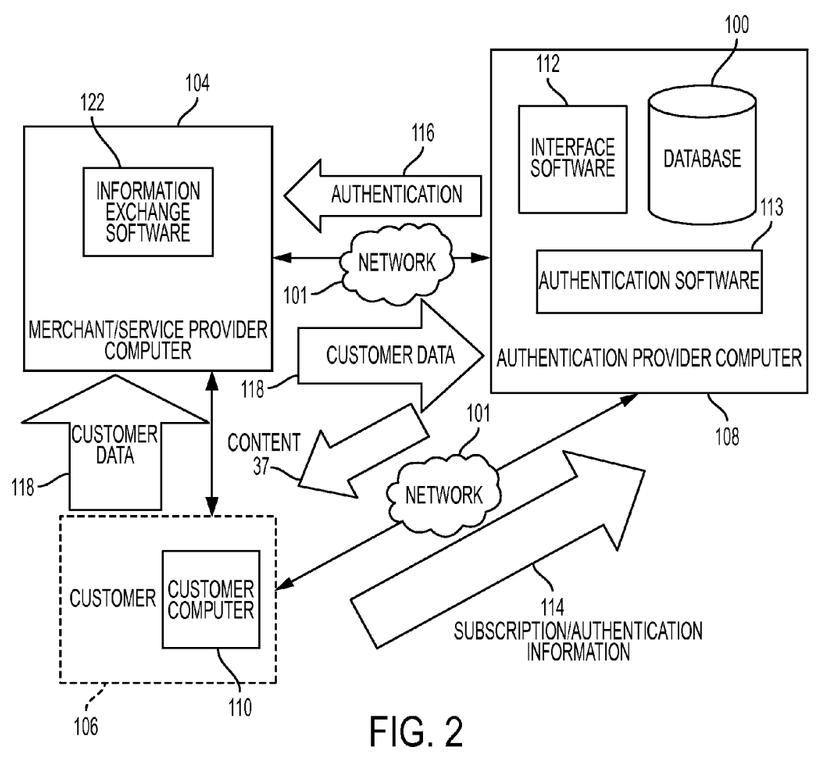
FIG. 2 is a schematic block diagram of the computer environment in which the system and method of one embodiment of content delivery are executed according to the present teachings.

Referring now primarily to FIG. 2, shown is a schematic block diagram of the computer environment in which the system and method of one embodiment of content delivery are executed according to the present teachings. In one embodiment, the environment in which system 200 (FIG. 3) executes can include, but is not limited to including, merchant/service provider computer 104 for providing the capabilities of system 200 (FIG. 3) as a service. Merchant/service provider computer 104 can execute information exchange software 122 for providing selected content to customer 106. In particular, information exchange software 122 can receive customer data 118 from customer computer 110, can supply customer data 118 to authentication provider computer 108, and can receive authentication 116 through interface software 112 to use the particular content 37. Authentication provider computer 108 can execute authentication software 113 which can negotiate permission and royalties when necessary for particular content. Database 100 can temporarily or permanent store content 37 selected by customer 106 through subscription/authentication information 114.

Figure 3:
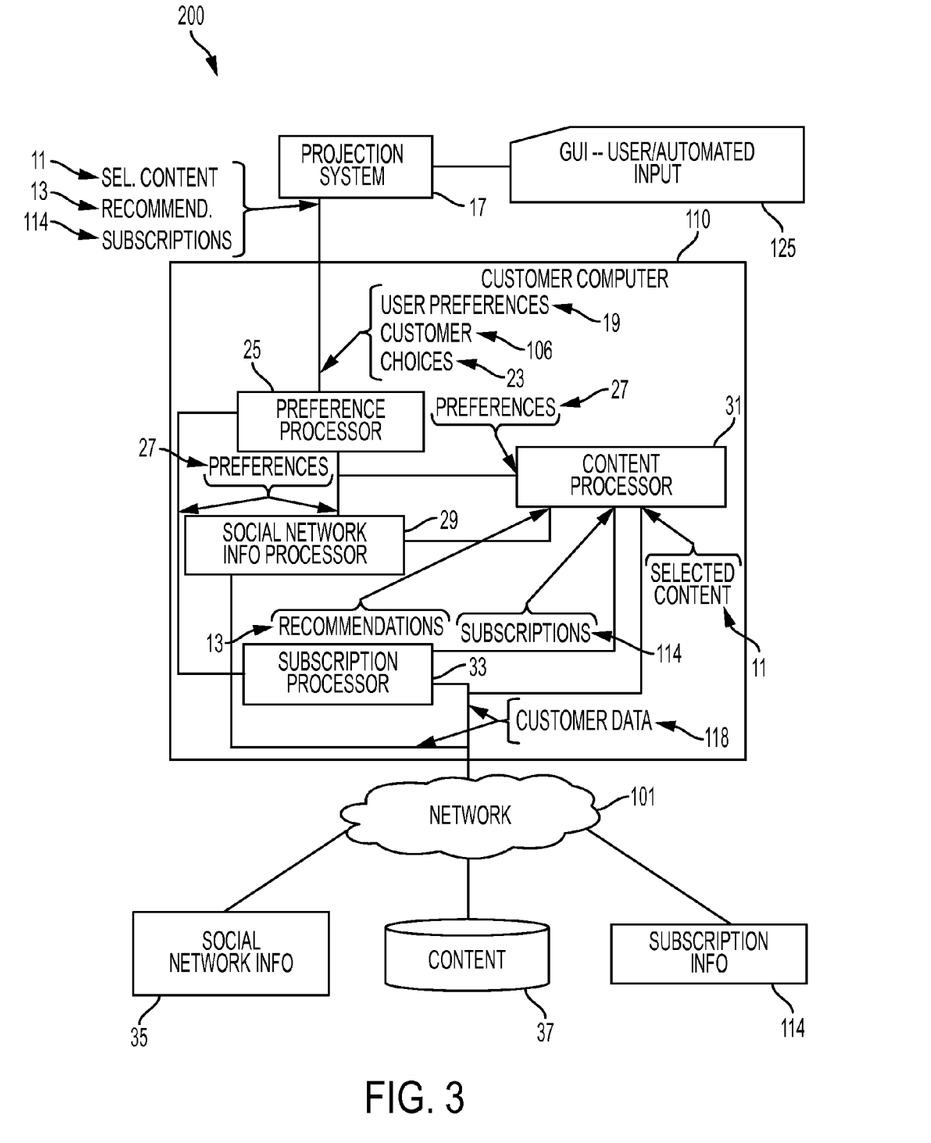
FIG. 3 is a schematic block diagram of one embodiment of the projection content system according to the present teachings.

Referring now to FIG. 3, shown is a schematic block diagram of one embodiment of the projection content system according to the present teachings. System 200 can include, but is not limited to including, customer computer 110 that can include, but is not limited to including, preference processor 25 receiving user preferences 19 about customer 106 and choices 23 made by customer 106 from both projection system 17 and a graphical user interface or automated input 125. In turn, preference processor 25 can provide, for example, but not limited to, selected content 11, recommended content 13, and subscription content 114 to projection system 17 to display. Preference processor 25 can prepare, from its input, preferences 27, and can provide preferences 27 to social network information processor 29 and content processor 31, both of which may use preferences 27 to prepare customer data 118 to request content 37 as shown in FIG. 2. System 200 can also include subscription processor 33 receiving subscription preferences from preference processor 25, and providing subscriptions 114 to content processor 31, which can reformat them to create customer data 118 to request subscriptions 114. A subset of content 37, selected content 11, can be provided to content processor 31, which can provide selected content 11 to projection system 17 for display. Customer data 118 can also include social network information 35.

Figure 4:
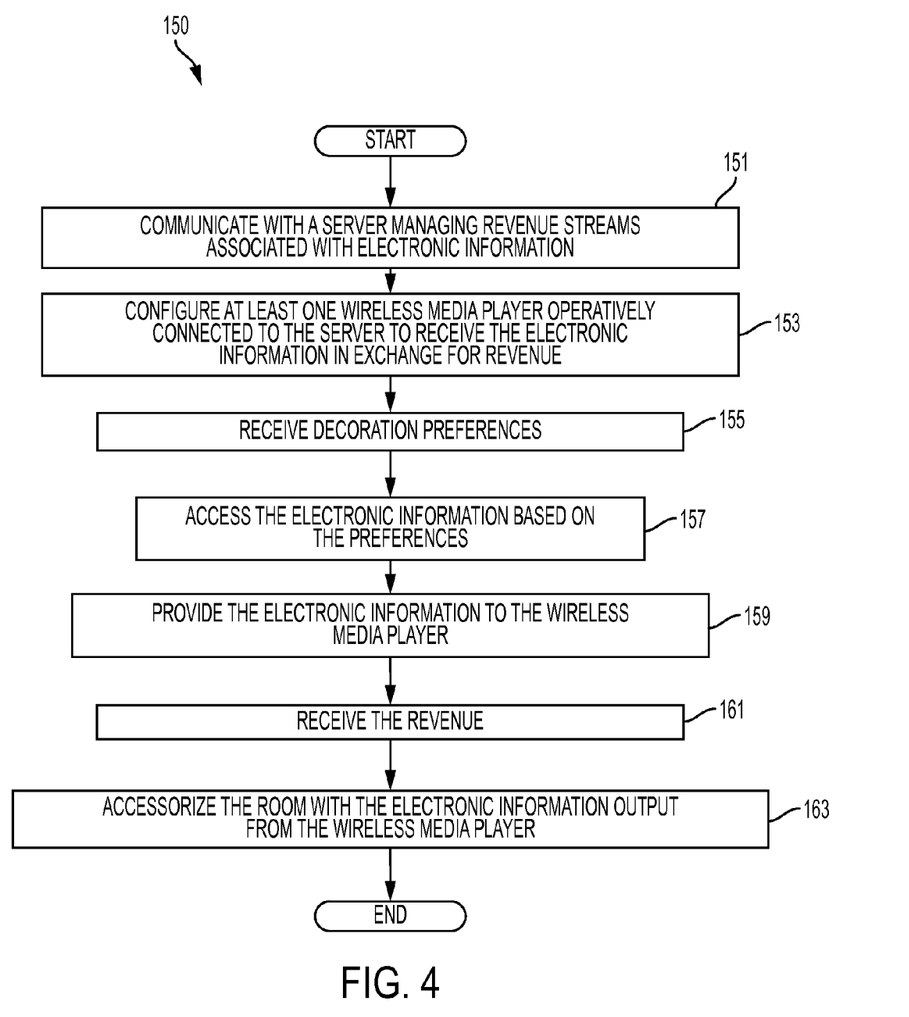
FIG. 4 is a flowchart depicting one embodiment of a method for providing content according to the present teachings.

Referring now to FIG. 4, shown is a flowchart depicting one embodiment of a method for providing content according to the present teachings. The method 150 of the present embodiment can include, but is not limited to including, the steps of communicating 151 with a server managing revenue streams associated with electronic information, configuring 153 at least one wireless media player operatively connected to the server to receive the electronic information in exchange for revenue, receiving 155 decoration preferences, accessing 157 the electronic information based on the preferences, providing 159 the electronic information to the wireless media player, receiving 161 the revenue, and accessorizing 163 the room with the electronic information output from the wireless media player. The method 150 can optionally include the step of receiving recommendations about the step of accessorizing from a social network.

The present embodiment is directed to systems and methods that can be executed in hardware, firmware, and/or software for accomplishing the methods discussed herein, and, possibly, computer readable media storing software for accomplishing these methods and system, although not limited thereto. The various modules described herein can be provided in conjunction with a single CPU, or on an arbitrary number of different CPUs. Other alternative computer platforms can be used. The operating system can be, for example, but is not limited to, WINDOWS® or LINUX®. Communications links can be wired or wireless, for example, using cellular communication systems, military communications systems, and satellite communications systems. Any data and results can be stored for future retrieval and processing, printed, displayed, transferred to another computer, and/or transferred elsewhere.

In compliance with the statute, the present embodiment has been described in language more or less specific as to structural and methodical features. It is to be understood, however, that the present embodiment is not limited to the specific features shown and described, since the systems herein disclosed comprise preferred forms of putting the present embodiment into effect.

Referring again to FIG. 4, method 150 can be, in whole or in part, implemented electronically. Signals representing actions taken by elements of systems that implement the methods of the present embodiment, and other disclosed embodiments can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphics in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Figure 5:
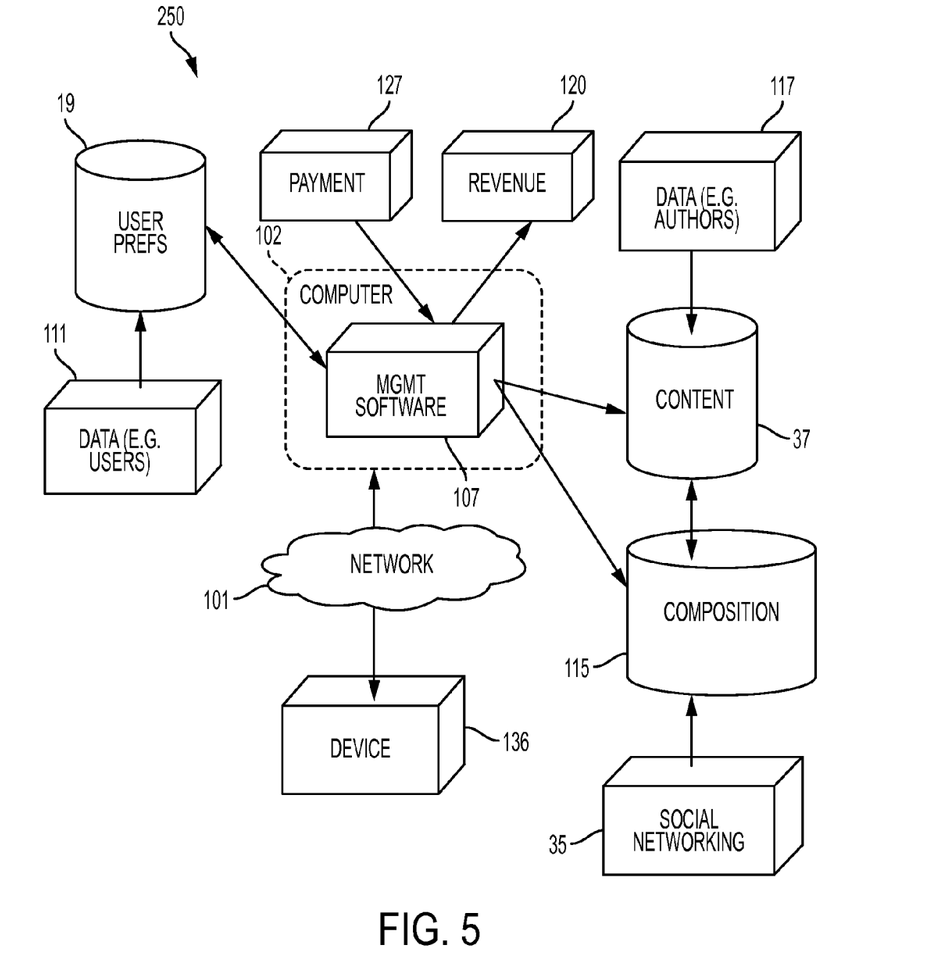
FIG. 5 is a schematic diagram depicting one embodiment of the content revenue system according to the present teachings.

Referring now to FIG. 5, shown is a schematic diagram depicting one embodiment of the content revenue system according to the present teachings. As shown, system 250 can include, but is not limited to including, "copyright clearing house" functionality since content authors may add content to the system 250, which may then distribute the content to paying users, collecting the revenues and paying the content providers. A website, mobile application, some other user interface may be provided for content providers to upload content for distribution using the system 250. System 250 can include, but is not limited to including, projection device 136 communicatively interacting electronically with management software 107 executing on a computer 102, although not limited thereto. Such interaction may occur over a network 101 such as the Internet. Data 111, supplied to a user preferences database 19 by various means including, but not limited to, user input, can be accessed by the management software 107. Management software 107 split payment 127 among the content creator, system operator (provider) and others as revenue 120. Content creators may provide data 117 such as designs, documents, etc., to a content database 37. Management software 107 can provide the content database to users. Social networking software 36 such as applications, for example, but not limited to, FACEBOOK®, can interact with the content and create compositions 115 of the content. For example, a rotating display of content comprising the top forty pieces as rated by members of social networking software 36 may be created, although not limited thereto. In another embodiment, the system may display content from lists created by social networking groups or experts, although not limited thereto.

Figure 6:
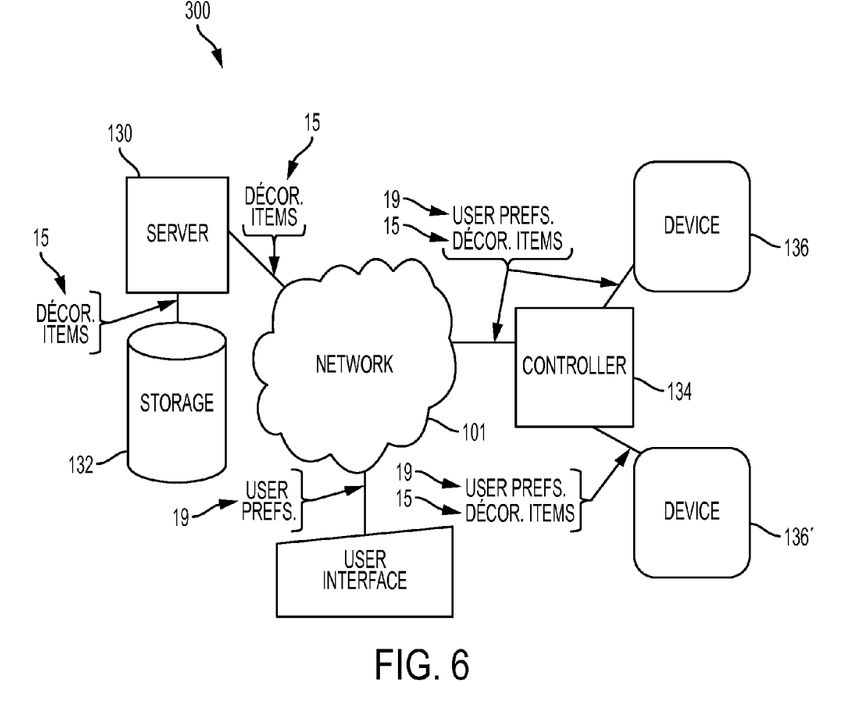
FIG. 6 is a schematic diagram depicting another embodiment of the content revenue system according to the present teachings.

Referring now to FIG. 6, system 300 can include, but is not limited to including, server 130 providing content from storage 132, for example, through network 101, to controller 134 which displays content onto device 136 and/or device 136'. The projection device 136 can be shaped like a frame with a special screen material and a small projector that extends out from the frame and projects onto the screen. In this way, the projector may look just like lights do on traditional frames that are used in museums today. In another embodiment, the projection device 136' can include a flat panel monitor or similar device, although not limited thereto. For example, content can be provided to television screens or computer screens in applications or as screensavers or backgrounds, although not limited thereto. Instead of projecting, a network connectable controller 134 including the technology of the present embodiment can be associated with one or more display devices (e.g., televisions, monitors, etc.) and can deliver content to the devices wirelessly (e.g., radio transmission, BLUETOOTH®, wifi, etc.) or through a wired connection.

It is also appreciated that the system according to the present teachings may include a software interface for users to select content and pay for said content. Such interface may include a web page, an application for a mobile device such as an iPhone app or for some other smart device, or any other type interface as would be appreciated by one skilled in the art. Through this interface users may not only select content 11 (FIG. 3) but also manage their user preferences 19 (FIG. 3), although not limited thereto.

Any system of the present teachings can provide access to content in public spaces. For example, any of systems 200 (FIG. 3), 250 (FIG. 5), or 300 (FIG. 6) can detect the proximity of a user (e.g., geolocation of mobile device, by authenticating login at a kiosk, etc.) and provide content to the user at that location. If a user is near a kiosk, the kiosk may deliver user-specific content for that user's benefit, such as alerts regarding messages (e.g., email, news, etc.). In another embodiment, when a user of the system checks into a hotel, the hotel lobby and/or front desk may display preferred content to the user in order to provide a more personalized experience. Again, the system may detect the proximity of a user (e.g., based on geolocation of mobile device or some other method) and display personalized content. Any of systems 200 (FIG. 3), 250 (FIG. 5), or 300 (FIG. 6) can provide for content to be delivered in a larger version than a mobile device is able to provide.

In one embodiment, the "thin" client system of the present teachings can include use of a mobile application running a mobile device such as a smartphone, tablet or some other device. The projection can project the real-time display of some virtual desktop that can be controlled by the mobile application. In this way, the mobile device can communicate with a server which can provide content to the projection device. The user, for example, can control the manipulation of content solely through the application on the mobile device, although not limited thereto, such that the processing requirements of the client (e.g., the projection device) can be minimized. Instead, the user can use a mobile device, the application, and a light projection system in order to be provided with a fully-functioning computing device. Control through the mobile device can include movements/gestures with the mobile device (e.g., through use of an accelerometer in the device), interacting with a touch screen on the mobile device, or any other way of interacting with content, as would be appreciated by one of skill in the art.

The system can also include building materials embedded with lighting devices. For example, molding may have light strips in one embodiment and the light can be controlled by the system of the present teachings. Any of systems 200 (FIG. 3), 250 (FIG. 5), or 300 (FIG. 6) can also control hallway lighting, overhead lighting, lighting of sculptural and/or architectural areas, or any other lighting. Any of systems 200 (FIG. 3), 250 (FIG. 5), or 300 (FIG. 6) can also provide for a light show of integrated control of lighting and display content.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A computer system for managing the distribution of decorating content for decorating a private hotel room, comprising:
   a non-transitory computer readable storage comprising preferred decorating content uploaded over a network by a plurality of hotel guests, and subscription decorating content uploaded by a plurality of copyright holders for revenue;
   a preference processor receiving input from a plurality of user interfaces operated by each of the plurality of hotel guests, the input including each hotel guest's decorating preferences;
   at least one projection system mounted inside each of the plurality of private hotel rooms, each projection system comprising a plurality of screens and a controller, the plurality of screens including a picture frame and a projection projected directly on a ceiling, a wall, or a piece of furniture,
   wherein the controller automatically determines the identity of a first hotel guest among the plurality of hotel guests when the first hotel guest is inside a first private hotel room among the plurality of private hotel rooms, the first private hotel room being reserved by the first hotel guest;
   a server in electronic communication with the non-transitory computer readable storage, the preference processor, and the projection systems, wherein the server:
   receives the identity of the first hotel guest,
   receives the first hotel guest's decorating preferences responsive to the preference processor receiving an input including the first hotel guest's decorating preferences,
   receives the size of the first private hotel room and the layout of the first private hotel room, the layout including the number and placement of screens in the first private hotel room,
   selects a selection of the preferred decorating content and a selection of the subscription decorating content based on the size and layout of the first private hotel room and the first hotel guest's decorating preferences, and
   transmits the selection of the preferred decorating content and the selection of the subscription decorating content to the controller of the first projection system over the network;
   wherein the controller causes the first projection system to project the selections onto the plurality of screens.

2. The system of claim 1 wherein the plurality of user interfaces comprises a web page or an application for a mobile device.

3. The system of claim 1 further comprising:
   a pointer operated by the first hotel guest, the pointer controlling positioning of at least one of the selection of the preferred decorating content and the selection of the subscription decorating content displayed by the controller of the first private hotel room, the first hotel guest clicking and dragging the at least one of the selection of the preferred decorating content and the selection of the subscription decorating content using the pointer.

4. The system of claim 1 wherein the controller and at least one screen in the first private hotel room comprise a single physical device.

5. The system of claim 1 wherein the controller of the first hotel room automatically adjusts an angle of display of at least one of the selection of the preferred decorating content and the selection of the subscription decorating content selection of the decorating content, creating an undistorted view of the at least one of the selection of the preferred decorating content and the selection of the subscription decorating content displayed on one of the screens.

6. The system of claim 1 wherein each of the plurality of screens in the first private hotel room simultaneously displays a different one of the selection of the preferred decorating content and the selection of the subscription decorating content.

7. The system of claim 1 wherein at least one of the selection of the preferred decorating content and the selection of the subscription decorating content comprises advertising.

8. The system of claim 1 wherein determining the room layout of the first private hotel room comprises scanning the first private hotel room.

9. The system of claim 1 wherein the decorating preferences of the first hotel guest comprises a decorating theme and the selecting the selection of the preferred decorating content or the selection of the subscription decorating content is based on the decorating theme.

10. The system of claim 1 wherein a proximity to the first private hotel room of the first hotel guest is detected and the controller of the first private hotel room automatically displays the selection of the preferred decorating content or the selection of the subscription decorating content when the proximity reaches a predetermined threshold.

11. The system of claim 1 wherein the selection of the preferred decorating content and the selection of the subscription decorating content comprises: recommended content based on the decorating preferences of the one of the plurality of hotel guests; and, subscription content provided on a subscription basis.

12. The system of claim 1 wherein a subset of the decorating content is uploaded using the user interface.

13. The system of claim 1 further decorating a plurality of physical surfaces in a second private hotel room,
- the server identifying another of the plurality of hotel guests and selecting another selection of decorating content based on the decorating preferences of the another of the plurality of hotel guests and the plurality of physical surfaces;
- a second controller receiving the another selection of the decorating content over the network
- and displaying the another selection of the decorating content on the second plurality of physical surfaces.

* * * * *